United States Patent
Lee et al.

(10) Patent No.: US 6,786,480 B2
(45) Date of Patent: Sep. 7, 2004

(54) SHEET CONVEYING APPARATUS FOR IMAGE INFORMATION PROCESSOR

(75) Inventors: Yun-Suk Lee, Suwon (KR); Hyun-Cheol Lee, Seoul (KR); Su-In Lee, Sungnam (KR); Joon-Wan Pyeon, Bucheon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/464,792

(22) Filed: Jun. 19, 2003

(65) Prior Publication Data

US 2003/0209849 A1 Nov. 13, 2003

Related U.S. Application Data

(62) Division of application No. 09/985,858, filed on Nov. 6, 2001.

(30) Foreign Application Priority Data

Jan. 29, 2001 (KR) .......................................... 2001-4115

(51) Int. Cl.[7] .............................................. B65H 5/00
(52) U.S. Cl. ............................... 271/10.12; 271/10.04; 271/242
(58) Field of Search ........................... 271/10.04, 10.12, 271/242

(56) References Cited

U.S. PATENT DOCUMENTS

| | | | | |
|---|---|---|---|---|
| 4,722,518 A | * | 2/1988 | Watanabe | 271/9.05 |
| 5,395,102 A | * | 3/1995 | Eguchi | 271/10.04 |
| 5,601,281 A | * | 2/1997 | Kubodera et al. | 271/10.04 |
| 5,634,635 A | * | 6/1997 | Kobayashi et al. | 271/3.16 |
| 5,749,570 A | * | 5/1998 | Iwata et al. | 271/10.13 |
| 5,755,435 A | * | 5/1998 | Fujiwara | 271/4.04 |

\* cited by examiner

Primary Examiner—Christopher P. Ellis
Assistant Examiner—Mark A. Deuble
(74) Attorney, Agent, or Firm—Sughrue Mion, PLLC

(57) ABSTRACT

A paper sheet conveying apparatus and method for an image information processor in which a paper sheet with image information recorded thereon can be prevented from a skew carriage. The paper sheet conveying apparatus includes a driving motor which is controlled to be shifted from a forward revolution mode to a reverse revolution mode or vice versa. The paper conveying apparatus further includes a power cleaving means that selectively supplies the power to a first power transmitting system and to a second power transmitting system.

4 Claims, 12 Drawing Sheets

SHEET CONVEYING APPARATUS FOR IMAGE INFORMATION PROCESSOR

This is a divisional of application Ser. No. 09/985,858 filed Nov. 6, 2001; the disclosure of which is incorporated herein by reference.

BACKGROUND OF THE INVENTION

1. Field of the Invention

The present invention relates to an image information processor such as a facsimile, copy machine and the like and method for using the same. More specifically, the present invention relates to a paper sheet conveying apparatus for an image information processor, which is controlled to prevent a paper sheet with image information recorded thereon from a skew carriage.

2. Description of the Related Art

For example, in image information processors, such as facsimiles, copy machines, printers and the like, there is a paper sheet conveying apparatus for conveying a paper sheet (with image information recorded thereon) to an image reading part. This paper sheet conveying apparatus has the function of correcting a skew advancement of the paper sheet by arranging a leading end of the paper sheet.

The paper sheet conveying apparatus that has the function of correcting a skew advancement of the paper sheet is disclosed in U.S. Pat. No. 5,749,570 and is schematically illustrated in FIG. 1.

Referring to FIG. 1, a conventional paper sheet conveying apparatus of an image information processor includes a paper sheet separating roller 11 and a paper sheet guide 12 installed above and below respectively, for separating one paper sheet from a plurality of stacked paper sheets and conveying it to an image reading part 5, and a white roller 21 installed opposite to the image reading part 5, for reading the image information on the paper sheet.

As shown in FIG. 1, the image reading part 5, which is upwardly biased by a spring to closely contact the white roller 21, reads the image information of the paper sheet by an image reading sensor (not illustrated) into analogue signals, converts the analogue signals into digital signals, and outputs the digital signals.

A reference numeral 6 indicates a paper presence sensor for sensing the presence or absence of the paper in a paper stack pad 4. A reference numeral 7 indicates a paper leading edge sensor for sensing the leading edge of the advancing paper sheet and outputting the sensed information.

The paper leading edge sensor 7 outputs one set of control signals for matching the image reading starting point to the image reading starting time for the image reading part 5, and another set of control signals for shifting the revolutions of a driving motor from the forward direction to the reverse direction or vice versa, thus for correlatively driving the paper sheet separating roller 11 and the white roller 21.

As shown in detail in U.S. Pat. No. 5,749,570, the paper sheet conveying apparatus as described above arranges the leading edge of the paper and corrects the skew advancement by shifting the revolution direction of the driving motor and by using a mechanical timer mechanism.

Accordingly, the conventional paper sheet conveying apparatus of the image information processor is very complicated in its constitution, and has to be improved in its precision. Also, since the white roller 21 is momentarily stopped and driven by the mentioned system to correct the skew carriage of the paper, a precision control is not guaranteed, particularly when high speed feeding is carried out.

Further, in the conventional paper sheet conveying apparatus, a separate paper-ejecting roller cannot be easily installed in view of its constitution. That is, in the case where a paper ejecting roller is installed, the paper ejecting roller revolves in the reverse direction during the reverse revolution of the driving motor, and therefore, the paper sheet moves in the reverse direction, with the result that the ejection of the paper sheet becomes impossible.

Accordingly, in the conventional paper sheet conveying apparatus, the paper-ejecting roller is excluded, and therefore, high-speed paper ejection becomes impossible, with the result that the image information processing is limited in its speed and capacity.

SUMMARY OF THE INVENTION

The present invention is intended to overcome the above-described disadvantages of the conventional technique.

An aspect of the present invention is to provide a paper sheet conveying apparatus of an image information processor and method, in which the correction precision for the skew advancement of the paper sheet is improved.

Another aspect of the present invention is to provide a paper sheet conveying apparatus of an image information processor, in which the conveying-driving units are driven interactively and selectively by a single driving source, thereby improving the paper sheet ejection efficiency suitably for a large capacity paper sheet conveying apparatus.

In achieving the above aspects, the paper sheet conveying apparatus of an image information processor according to the present invention includes a driving unit which interactively and selectively drives a paper sheet separating roller, a paper sheet aligning roller and a paper sheet ejecting roller at different conveying stages, the paper sheet separating roller, the paper sheet aligning roller and the paper sheet ejecting roller are sequentially disposed for uni-directionally conveying an image-recorded paper sheet.

Further, the driving unit includes a driving motor which is mode-shiftably driven in a forward mode direction and a reverse mode direction, a power cleaving mechanism for selecting a rotational driving force in a certain direction to transmit the driving force through different paths in accordance with the driving modes, a first power transmitting system which drives the paper sheet separating roller and the paper sheet ejecting roller correspondingly with a conveying direction by being selectively connected to the power cleaving mechanism; and a second power transmitting system which drives the paper sheet separating roller, the paper sheet aligning roller and the paper sheet ejecting roller in the conveying direction by being selectively connected to the power cleaving mechanism.

The power cleaving mechanism includes a main gear connected to an output shaft of the driving motor, and first and second cam gears respectively installed on both ends of the output shaft of the main gear to be moved in a linear direction, for advancing and withdrawing mutually along an axis of the main gear in accordance with the forward and reverse mode directions of the driving motor.

The first power transmitting system includes a first connection gear which is selectively connected in accordance with the straight movements of the first cam gear, and a first passive gear installed on a shaft of the paper sheet separating roller and a second passive gear installed on a shaft of the paper sheet ejecting roller so that the first and second passive gears are connected to the first connection gear.

The second power transmitting system includes a second connection gear which is selectively connected to the second cam gear, a connecting gear installed on a shaft of the paper sheet aligning roller, for being connected to the second connection gear, and a power transmitting means for selectively connecting the passive gear of the paper sheet ejecting roller.

The invention further provides for a paper sheet conveying apparatus of an image information processor, comprising means for interactively and selectively driving a paper sheet separating roller, a paper sheet aligning roller and a paper sheet ejecting roller at different conveying stages, the paper sheet separating roller, the paper sheet aligning roller and the paper sheet ejecting roller being sequentially disposed for uni-directionally conveying a paper sheet having a recorded image. The means for interactively and selectively driving includes a driving motor for being mode-shiftably driven in forward and reverse mode directions; and a power cleaving means for selecting a direction of a rotational driving force to transmit the driving force through different paths in accordance with driving modes. The means for interactively and selectively driving further includes means for driving the paper sheet separating roller and the paper sheet ejecting roller correspondingly with a conveying direction by being selectively connected to the power cleaving means when the driving motor is driven in one of the forward and reverse mode directions. Also included is a means for driving the paper sheet separating roller, the paper sheet aligning roller and the paper sheet ejecting roller in the conveying direction by being selectively connected to the power cleaving means when the driving motor is driven in another of the one of the forward and reverse mode directions.

The invention even further provides for a method for conveying a paper sheet in an image information processor, the image information processor having a paper sheet separating roller, a paper sheet aligning roller and a paper sheet ejecting roller. The method comprises feeding a paper sheet toward the aligning roller; and providing, selectively, a rotational driving force by a driving motor in a forward revolution to the paper sheet separating roller and to the paper sheet ejecting roller, wherein the paper sheet aligning roller is not provided with the rotational driving force and is not rotating. The method further includes conveying the paper sheet into the non-rotating aligning roller and a non-rotating back-up roller, which faces the aligning roller, for a predetermined amount of time; and shifting the driving motor to a reverse revolution so as to provide a rotational driving force, after the predetermined time has expired, to the paper sheet separating roller, the paper sheet aligning roller and the paper sheet ejecting roller, so that the paper sheet is conveyed to an image reading portion.

BRIEF DESCRIPTION OF THE DRAWINGS

The above aspects and other advantages of the present invention will become more apparent by describing in detail the preferred embodiments of the present invention with reference to the attached drawings in which.

DETAILED DESCRIPTION OF THE PREFERRED EMBODIMENTS

The paper sheet conveying apparatus and method of the image information processor according to the present invention will be described in detail by referring to the attached drawings.

Figure 1:
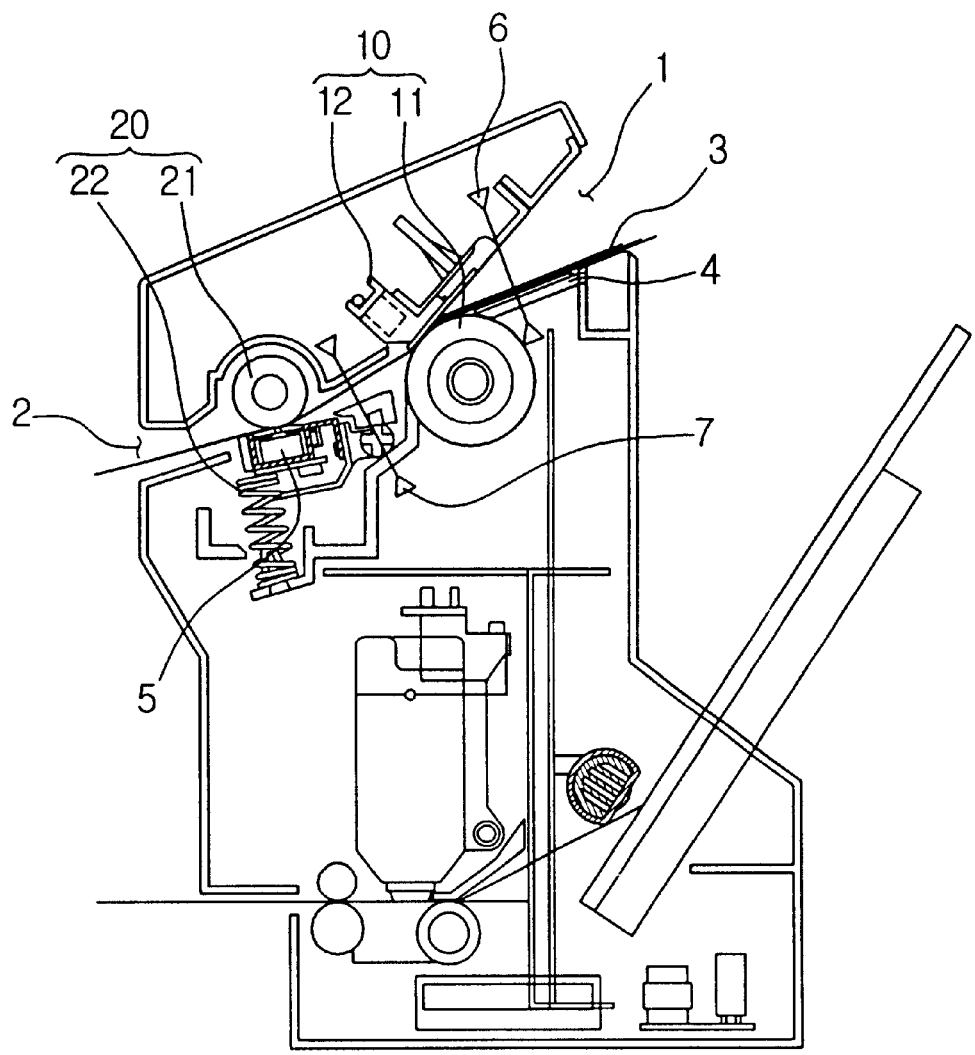
FIG. 1 schematically illustrates the constitution of the conventional paper sheet conveying apparatus of the image information processor.
Figure 2:
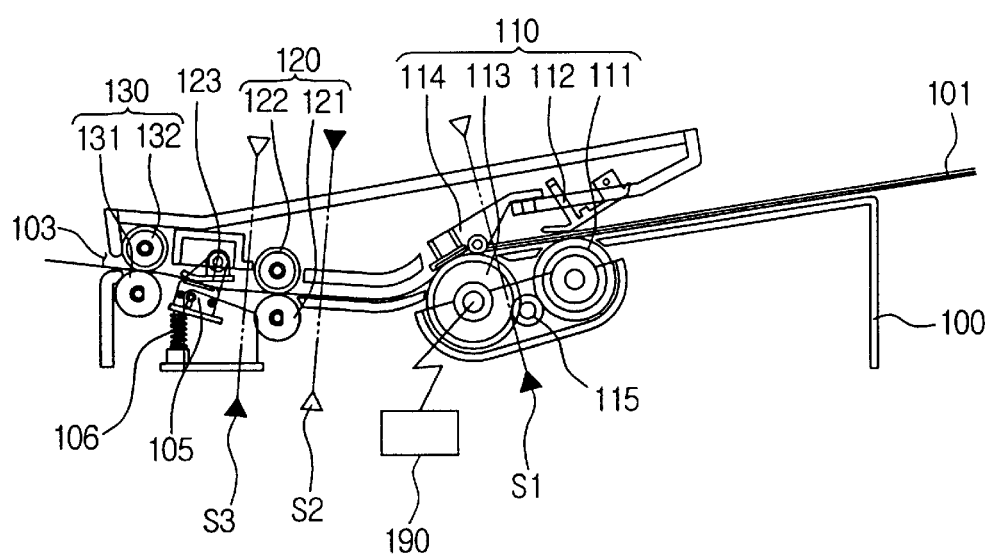
FIG. 2 schematically illustrates the constitution of the paper sheet conveying apparatus of the image information processor according to the present invention.

Referring to FIG. 2, the paper sheet conveying apparatus of an image information processor according to the present invention includes a paper sheet feeding unit 110 for picking up paper sheets 101 of a paper sheet stack pad 100 to convey them to an image reading part 105, a paper sheet aligning unit 120 for restricting and aligning the leading edges of the paper sheets conveyed from the image reading part 105, a paper sheet ejecting unit 130 for ejecting the paper sheets downstream of the image reading part 105 after the reading of the images, and a driving unit 190 for controlling the driving of the respective units.

The paper feeding unit 110 includes a paper sheet feeding roller 111, a paper sheet separating roller 113, a paper pressing member 112, and a paper sheet separating guide 114, the two latter elements 112 and 114 respectively face upper portions of the former two elements 111 and 113.

The paper sheet feeding roller 111 is driven passively by the paper sheet separating roller 113 so as to transmit a rotating force to the lowermost one of the paper sheets, which are loaded on the paper sheet stack pad 100. The paper pressing member 112 presses down the uppermost paper sheet of the paper stacking pad 100, so that the rotating force of the paper sheet feeding roller 111 can be properly transmitted to the paper sheet.

The paper sheet separating roller 113 and the paper sheet separating guide 114 act on the plurality of the paper sheets, in such a manner that the paper sheets can be separated one by one, and can be conveyed to the paper aligning unit 120.

In FIG. 2, a reference numeral 115 indicates an idle gear that connects the paper sheet-feeding roller 111 and the paper sheet-separating roller 113 together. S1 indicates a paper sensor for sensing the presence of the paper sheets on the paper stack pad 100. For example, a non-contacting type sensor such as a photo-sensor or the like, or a contacting type sensor such as a solenoid-driven pivotal lever can be employed.

The aligning unit 120 includes a back-up roller 122 and an aligning roller (or a registration roller) 121 disposed in parallel with each other vertically for performing contacted revolutions.

The back-up roller 122 and an aligning roller 121 act on the paper sheets which advance toward the image reading part 105, so as to control the conveying time. Thus, any skew advancement of the paper sheets can be corrected, so that the paper sheets can be conveyed to the image reading part 105 in an aligned manner.

In the drawing, reference symbols S2 and S3 indicate paper sheet sensors that are respectively installed upstream and downstream of the aligning unit 120. The sensor S2 senses the leading edge of the incoming paper sheet to output signals for controlling the driving time of the aligning roller 121 and the back-up roller 122.

That is, the leading edge of the paper sheet is manipulated to form a loop in a state when the aligning roller 121 and the back-up roller 122 are stopped. In this state, the sensor S2 outputs control signals to drive the aligning roller 121 and the back-up roller 122 with a time gap, so that any skew advancement of the paper sheets can be corrected.

Further, the sensor S3 senses the leading edge of the advancing paper sheet after the skew has been corrected by the aligning roller 121 and the back-up roller 122. Then the sensor S3 outputs control signals to make the image reading region-starting point correspond to the image reading starting time of the image reading part.

The paper sheet sensors S2 and S3 may consist of non-contacting type sensors such as photo sensors, or contacting type sensors such as solenoid-driven pivotal levers.

The image reading part 105 reads the image information of the paper sheet and converts it to digital image information. The image reading part 105 is upward biased by a spring 106 so as to form a nip between an image reading sensor (not illustrated) and a white bar 123.

The paper sheet ejecting unit 130 includes an ejecting roller 131 and a back-up roller 132 installed in a vertical relationship adjacent to each other.

Figure 3:
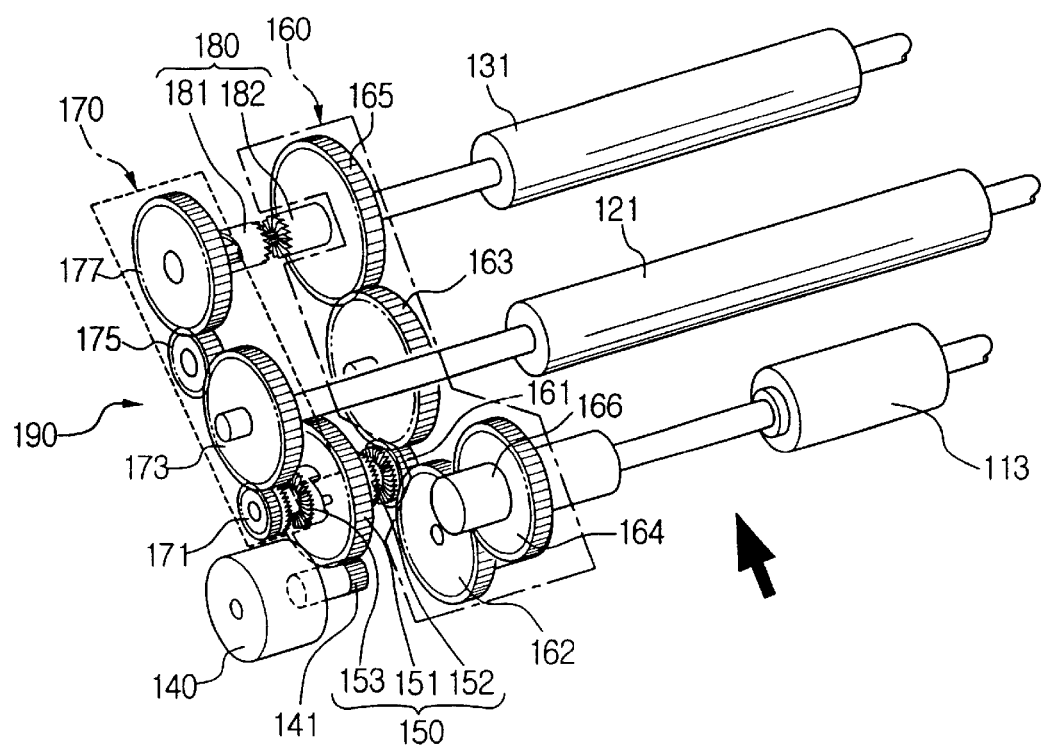
FIG. 3 is a perspective view of the driving unit that is installed in the paper sheet conveying apparatus of the image information processor according to the present invention.

With additional reference to FIG. 3, the driving unit 190 interactively and selectively drives the paper sheet separating unit 113, the aligning roller 121 and the paper sheet-ejecting roller 131 in the arrow-marked direction by using a single driving motor. The main portion of the driving unit 190 is illustrated in FIG. 3.

The driving unit 190 includes a driving motor 140 controlled to be driven in forward and reverse directions, and a power cleaving means 150 (151, 152, 153) for selectively transmitting the rotational driving force to a first power transmitting system 160 (161, 162, 163, 164, 165, 166), and to a second power transmitting system 170 (171, 173, 175, 177).

The power cleaving system 150 includes a main gear 151 meshed with a pinion 141. The pinion 141 is installed on the output shaft of the driving. motor 140, and first and second cam gears 152 and 153 are respectively installed on both ends of the shaft of the main gear 151, for advancing and withdrawing in accordance with the forward and reverse driving modes of the driving motor 140.

Figure 4:
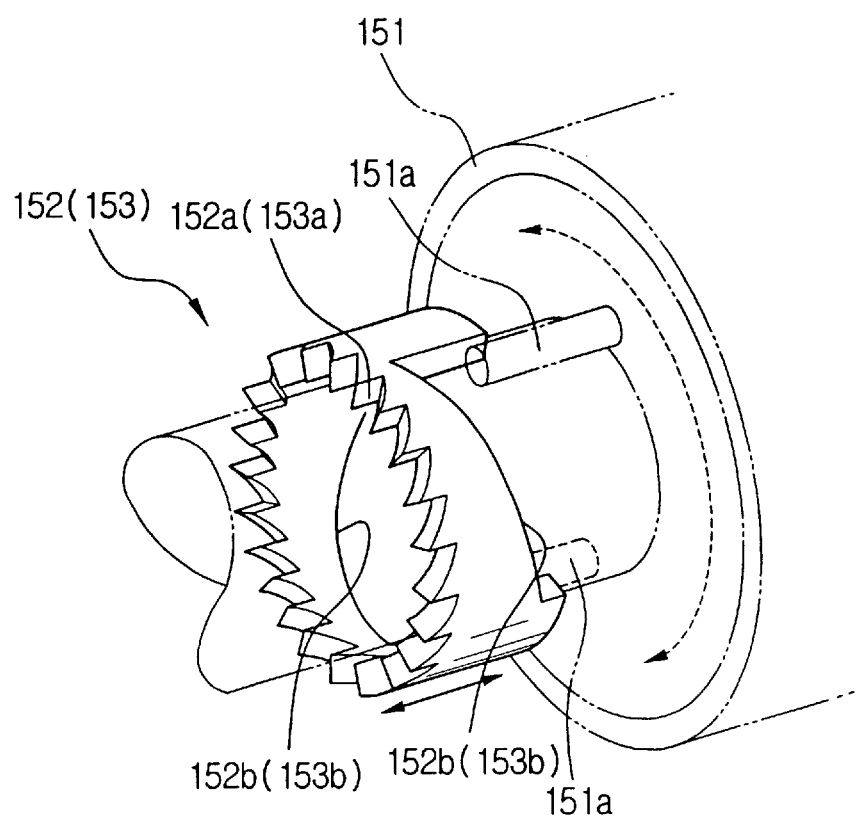
FIG. 4 schematically illustrates the critical portion of the driving unit of FIG. 3.

FIG. 4 schematically illustrates the coupling between the main gear 151 and the first and second cam gears 152 and 153. The first and second cam gears 152 and 153 have tooth parts 152a and 153a formed on the front ends thereof in clockwise or anticlockwise direction, and cam curve parts 152b and 153b formed on the rear ends.

On the main gear 151, there project a pair of cam pins 151a which interact with the cam curve parts 152b and 153b of the first and second cam gears 152 and 153 so as to perform a cam following.

Accordingly, the pair of cam pins 151a respectively move along the cam curve parts 152b and 153b of the first and second cam gears 152 and 153, with the result that the first and second cam gears 152 and 153 advance and withdraw mutually, facingly along the axis of the main gear 151.

The first power transmitting system 160 includes a first connection gear 161, relay gears 162 and 163, and passive gears 164 and 165. The first connection gear 161 is selectively contacted to the first cam gear 152.

The passive gears 164 and 165 are respectively installed on the revolution shafts of the paper sheet separating roller 113 and the paper sheet-ejecting roller 131, in such a manner that the passive gears 164 and 165 are rotationally connected to the first connection gear 161.

The relay gears 162 and 163 are disposed between the first connection gear 161 and the passive gears 164 and 165. The reference symbol 166 indicates a clutch means for driving the driving roller 113 uni-directionally.

The second power transmitting system 170 includes a second connection gear 171, a connecting gear 173, and a power transmitting mechanism 180.

The second connection gear 171 is installed in such a manner as to be selectively connected by the second cam gear 153. The connecting gear 173 is installed on the revolution shaft of the aligning roller 121 in such a manner that the gear 173 is connected to the second connection gear 171.

The first connection gear 161 and the second connection gear 171 respectively have gear parts formed in a direction corresponding to the gear parts 152a and 153a, and thus to be meshed with the gear parts 152a and 153a of the first and second cam gears 152 and 153.

The power transmitting mechanism 180 selectively connects the connecting gear 173 to the passive gear 165 that is installed on the revolution shaft of the paper sheet-ejecting roller 131.

The power transmitting mechanism 180 includes a third cam gear 181 installed on the shaft of a transmitting gear 177 to be moved in a linear direction, the transmitting gear 177 being connectable to the connecting gear 173 of the aligning roller 121 by the relay gear 175. The power transmitting mechanism also includes a third connection gear 182 installed on the revolution shaft of the paper sheet ejecting roller 131 and installed coaxially. with the passive gear 165, for being selectively connected to the third cam gear 181 in accordance with the movements of the third cam gear 181.

The third cam gear 181 has a constitution which is the same as that of the first and second cam gears 152 and 153 of FIG. 4. The third connection gear 182 has a gear part that can be meshed with the gear part of the third cam gear 181.

Figure 5:
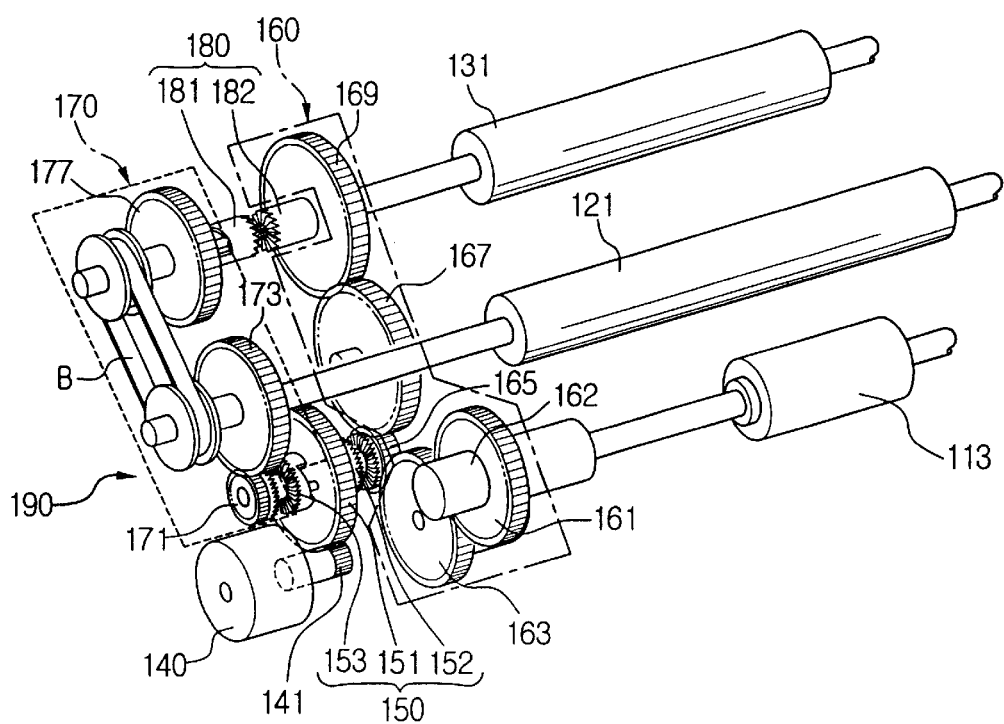
FIG. 5 is a schematic perspective view showing the driving unit according to another embodiment of the present invention.

FIG. 5 illustrates another embodiment of the above-described driving unit. In this embodiment, the relay gear 175, which in FIG. 4 is disposed between the connecting gear 173 of the aligning roller 121 and the transmitting gear 177, is eliminated, and instead, is replaced with pulleys and a belt B.

The paper sheet conveying apparatus of an image information processor according to the present invention will now be described as to its operations referring to FIGS. 6 through 17.

Figure 6:
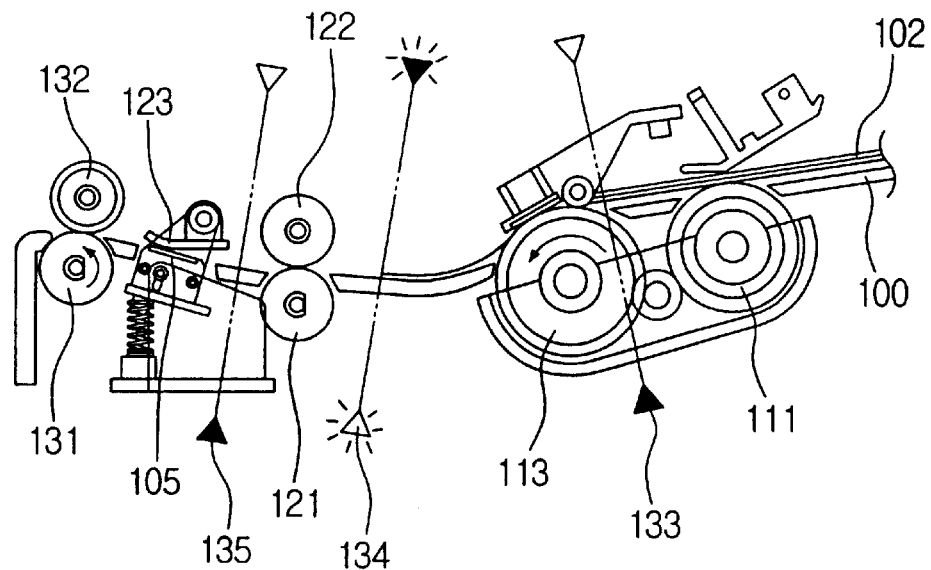
FIGS. 6 through 16 schematically illustrate the operation of the paper sheet conveying apparatus of the image information processor according to the present invention.
Figure 7:
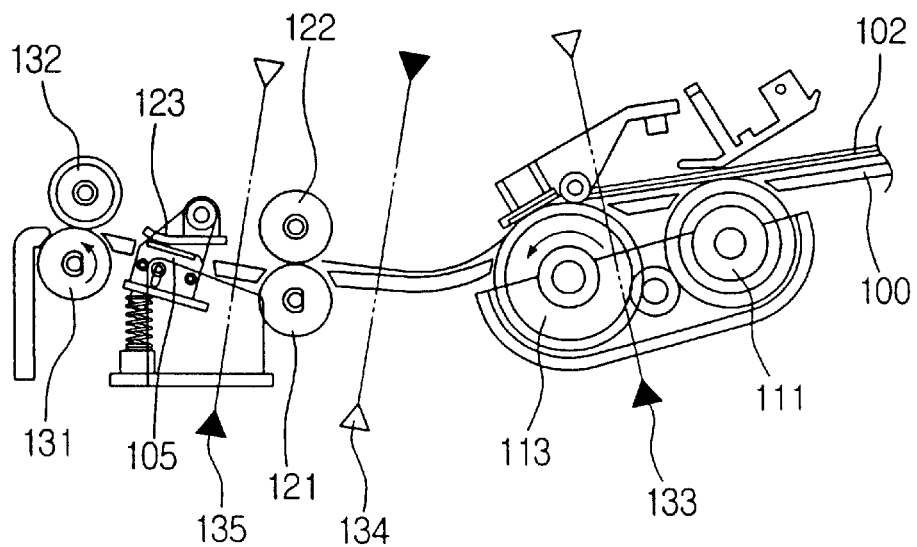
Figure 8:
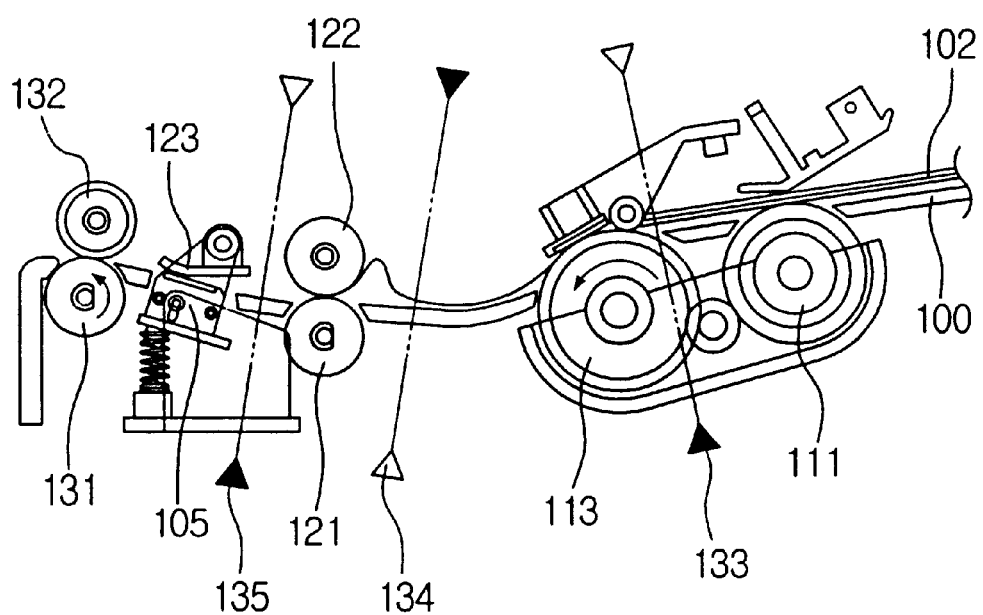
Figure 9:
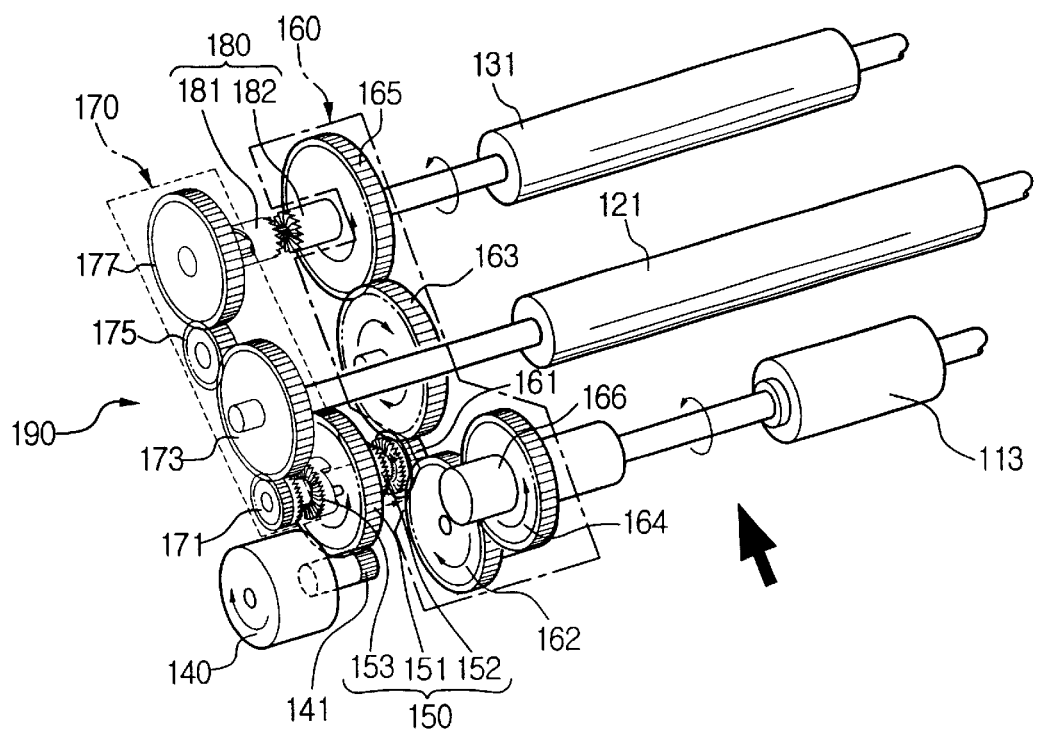

Referring to FIGS. 6 through 8, if the driving mode is carried out through a control panel (not illustrated) of the image information processor, the driving motor 140 revolves in the forward direction (in the solid line arrow mark direction in FIG. 9). Therefore, the paper sheet feeding roller 111 and the paper sheet separating roller 113 are driven to separate one of the paper sheets of the paper stack pad 100 so as to convey the separated sheet toward the aligning roller 121. This is a paper sheet feeding step.

Meanwhile, in the paper sheet feeding step, the rotational driving force of the driving motor 140 is transmitted through the power cleaving means 150 to the paper sheet separating roller 113, and is also transmitted to the paper sheet ejecting roller 131, so that the paper sheet ejecting roller 131 and the back-up roller 132 are subjected to idle revolutions. On the other hand, the paper sheet aligning roller 121 is prevented from receiving power from the driving motor 140 by the power cleaving means 150, and therefore, remains at a stopped state.

As the feeding of the paper sheet is progressed in a state that the leading edge of the paper sheet is restricted by the aligning roller 121 and the back-up roller 122 which are in a stationary state, as shown in FIG. 8, a loop of the paper sheet is formed.

Figure 17:
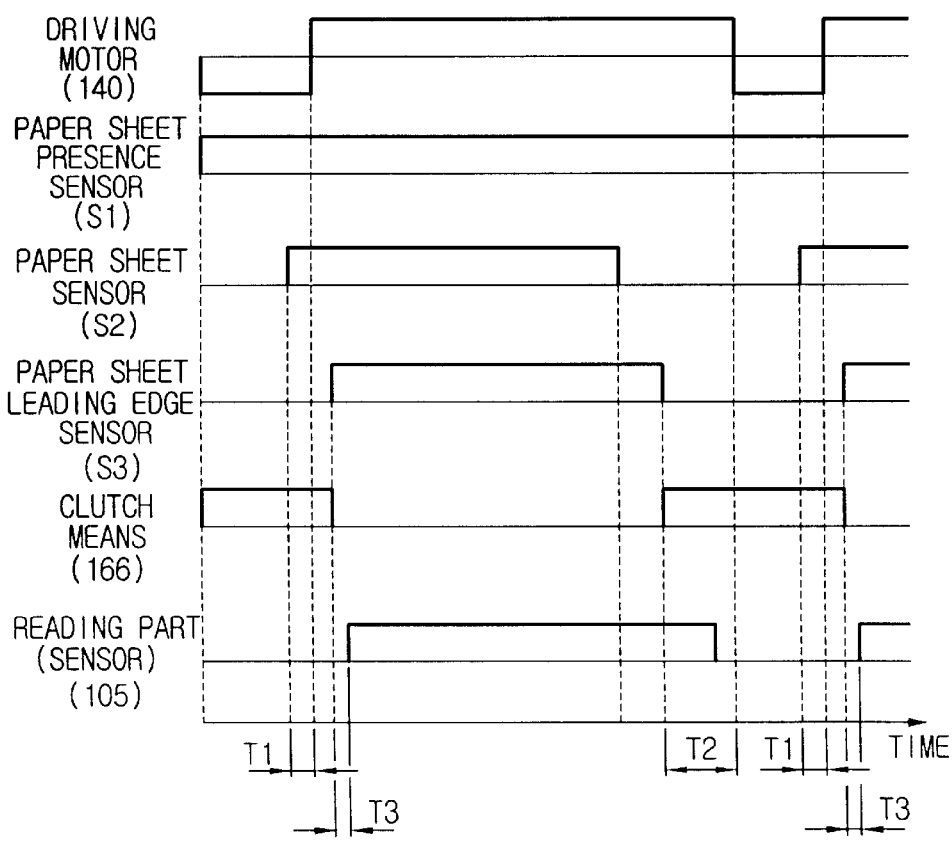
FIG. 17 is a time chart showing the operation control relations between the major constituents of the paper sheet conveying apparatus of the image information processor according to the present invention.

Meanwhile, referring to FIG. 17, during the paper sheet feeding procedure, the paper sheet sensor S2 senses the leading edge of the paper sheet and outputs a signal. By the signal, the aligning roller 121 and the back-up roller 122 are controlled to be in the stationary state for a predetermined extended time, and thus, the advancement of the paper sheet is delayed for the predetermined time, so that the leading edge of the paper sheet can be aligned from any skew.

Under this condition, the paper sheet separating roller 113 is rotated by the driving motor 140 until the loop of the paper sheet disappears. Then after the disappearance of the loop of the paper sheet, and the predetermined extended time has passed, the second power transmitting system is driven and the linear velocity of the aligning roller 121 becomes faster than the linear velocity of the paper sheet separating roller 113, and therefore, the paper sheet-separating roller 113 can perform idle revolutions depending on the conveying velocity of the aligning roller 121.

FIG. 9 illustrates the operation of the driving unit 190 during the paper sheet feeding step. The rotational force of the driving motor 140 drives the paper sheet separating roller 113 and the paper sheet ejecting roller 131 by the function of the power cleaving means 150.

Figure 10:
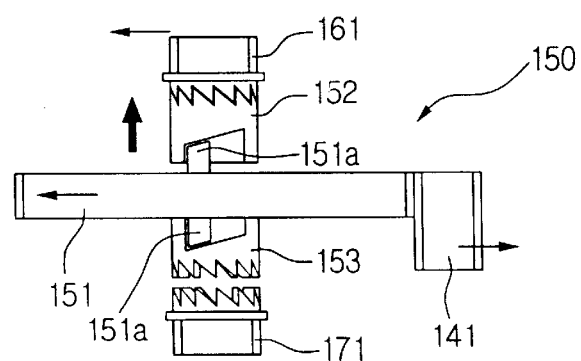

FIG. 10 illustrates the operations of the power cleaving means 150 during the paper sheet feeding step. The first cam gear 152 of the main gear 151 is connected to the first connection gear 161 in accordance with the forward revolutions of the driving motor 140.

Accordingly, the first connection gear 161 drives the paper sheet separating roller 113 through the relay gear 162 and the passive gear 166, and drives the paper sheet-ejecting roller 131 through the relay gear 163 and the passive gear 165.

Meanwhile, when the paper sheet 101 is temporarily stopped by being restricted by the aligning roller 121 and the back-up roller 122, and if a certain time period has elapsed, then the driving motor 140 is shifted to a reverse revolution mode (as shown by the dotted-line arrow marks in FIGS. 14A and 14B) so as to enter into an image reading step and a paper sheet ejecting step.

Figure 11:
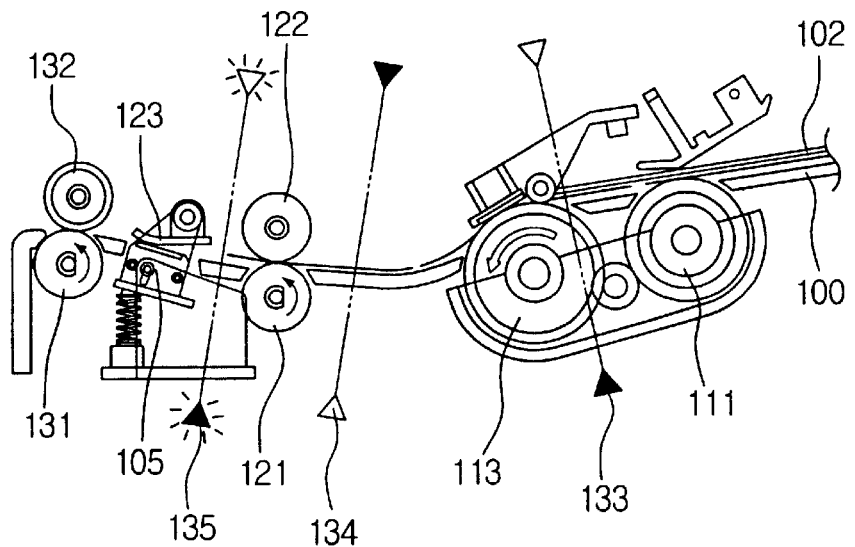
Figure 12:
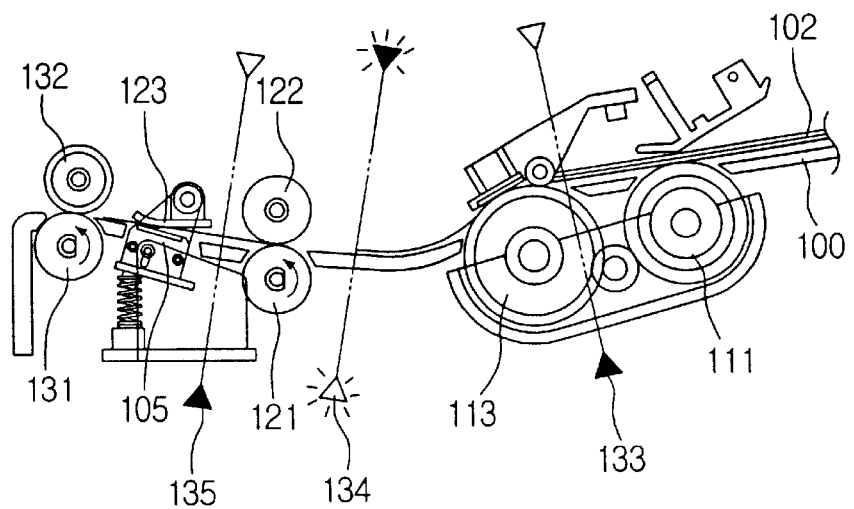
Figure 13:
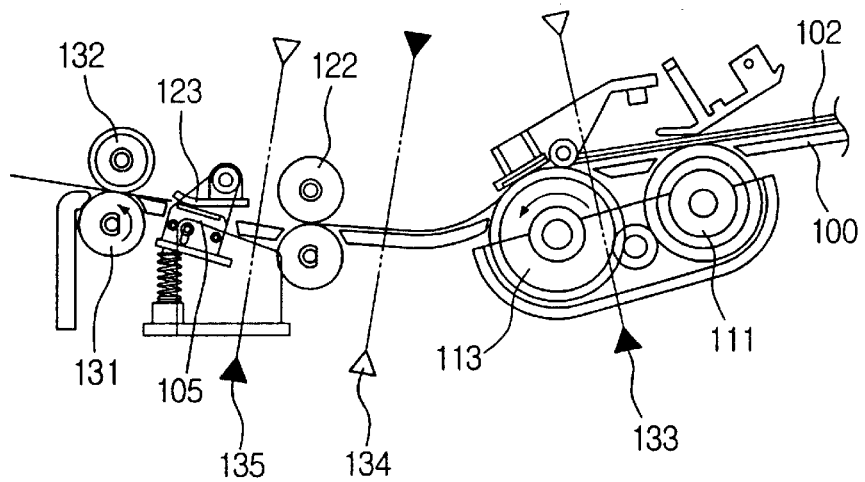

During the reverse driving of the driving motor 140, the aligning roller 121 starts to revolve as shown in FIG. 11. Then the paper sheet 101 is made to advance to the image reading part 105 as shown in FIG. 12, and after the reading of the images, the paper sheet is ejected to the outside by the driving forces of the paper sheet ejecting roller 131 and the back-up roller 132.

Referring to FIG. 17, during the conveying of the paper sheet as described above, the paper sensor S3 senses the leading edge of the paper sheet which has been corrected as to its skew by the aligning roller 121 and the back-up roller 122, and the paper sensor S3 outputs control signals to make the image reading starting point correspond to the image reading starting time of the image reading part 105.

Figure 14A:
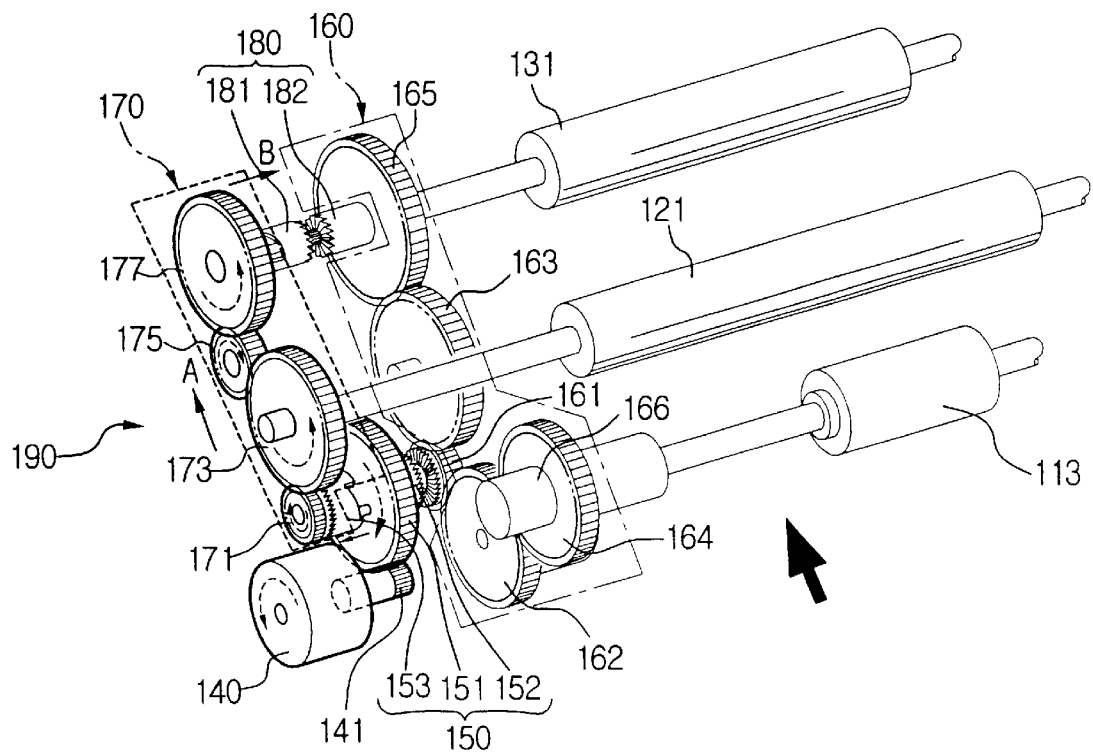
Figure 14B:
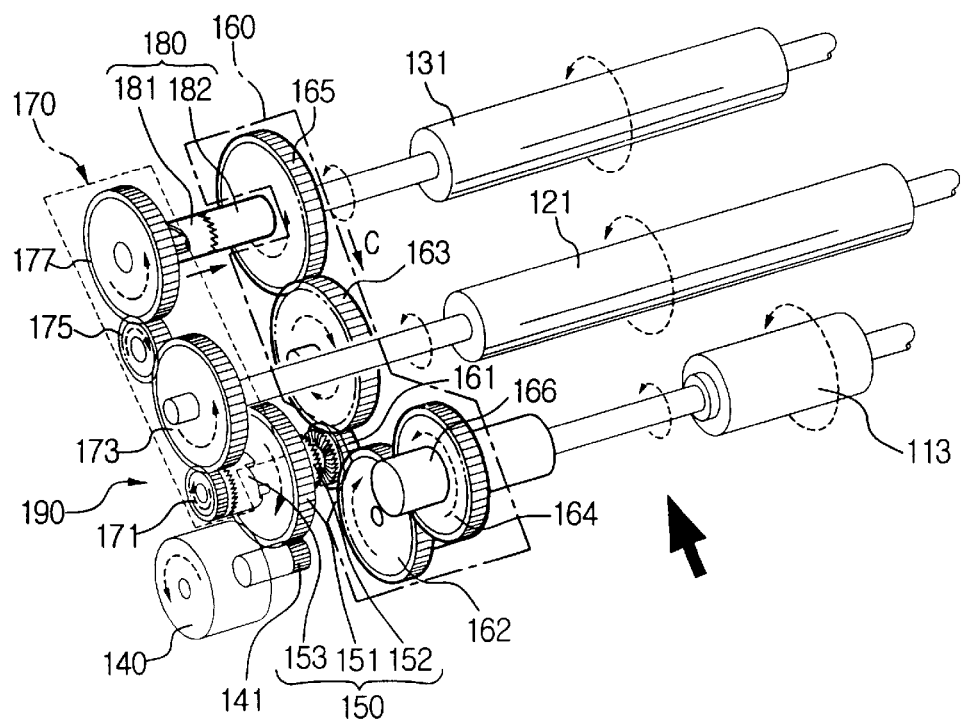

FIGS. 14A and 14B illustrate the operations of the driving unit 190 in the image reading step and the paper sheet ejecting step. First, as shown in FIG. 14a, the rotating force of the driving motor 140 is transmitted through the power cleaving means 150 and through the second connection gear 171 and the connecting gear 173 to the aligning roller 121 to drive the aligning roller 121.

At the same time, the power that has been transmitted to the connecting gear 173 is further transmitted through the directions of arrows A and B to the paper sheet ejecting roller 131. That is, the power is transmitted through the connecting gear 173, the relay gear 175, the transmitting gear 177 and the power transmitting mechanism 180 to the paper sheet ejecting roller 131 to drive the paper sheet ejecting roller 131 in the forward revolution mode.

Figure 15:
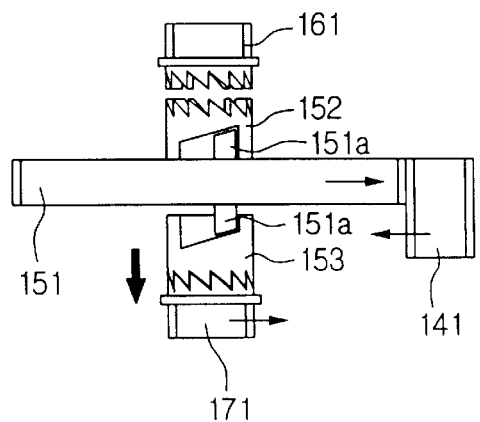

FIG. 15 illustrates the action of the power cleaving means 150 during the reverse evolution mode. Here, the power cleaving means 150 acts in a manner opposite to the forward revolution mode of FIG. 10.

That is, in accordance with the reverse revolutions of the driving motor 140, the second cam gear 153 of the main gear 151 is connected to the second connection gear 171, with the result that the connecting gear 173, the relay gear 175 and the transmitting gear 177 are driven.

Figure 16:
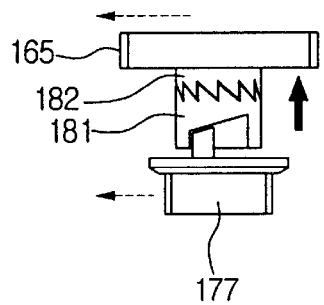

FIG. 16 illustrates the operation of the power transmitting mechanism 180 in the reverse revolution mode of the driving motor 140. Here, the third cam gear 181 of the transmitting gear 177 is connected to the third connection gear 182, and therefore, the paper sheet ejecting roller 131 is driven through the passive gear 165 that is connected to the third connection gear 182.

Accordingly, the paper sheet separating roller 113 is driven in the same direction as that in the forward revolution mode of the driving motor, because the power, which has been transmitted through the passive gear 165, the relay gear 163, the first connection gear 161 and the relay gear 162, is controlled to act as a uni-directional rotating force.

The above described paper sheet conveying procedure is repeatedly carried out to eject the paper sheets repeatedly.

According to the present invention as described above, the conventional complicated and time-consuming mechanism which requires high precision is not employed, but instead a simple gear train is adopted, so that the paper aligning and the skew correction can be realized in a simple and sure manner, thereby upgrading the reliability even when automatic feeding.

Further, the paper sheet-ejecting roller is additionally provided, so that the paper ejection can be efficiently carried out even on a large amount of stacked paper, and the ejected paper sheets can be neatly stacked. Particularly, in the present invention, even in the case where the whole paper-advancing path from the paper insertion part to the paper ejecting part has a horizontal contour, the paper ejection can be efficiently carried out.

In the above, the present invention was described based on the specific preferred embodiments and the attached drawings, but it should be apparent to those ordinarily skilled in the art that various changes and modifications can be added without departing from the spirit and scope of the present invention, which will be defined in the appended claims.

What is claimed is:

1. A method for conveying and aligning a paper sheet in an image information processor, the image information processor having a paper sheet separating roller, a paper sheet aligning roller and a paper sheet ejecting roller, the method comprising:

feeding a paper sheet toward the aligning roller;

providing, selectively, a rotational driving force by a driving motor in a forward revolution to the paper sheet separating roller and to the paper sheet ejecting roller, wherein the paper sheet aligning roller is not provided with the rotational driving force and is not rotating;

conveying the paper sheet into the non-rotating aligning roller and a non-rotating back-up roller, which faces the aligning roller, for a predetermined amount of time, so that the paper sheet is aligned; and shifting the driving motor to a reverse revolution so as to provide a rotational driving force, after the predetermined time has expired, to the paper sheet separating roller, the paper sheet aligning roller and the paper sheet ejecting roller, so that the paper sheet is conveyed to an image reading portion.

2. The method for conveying and aligning a paper sheet in an image information processor of claim 1, wherein the feeding includes the driving of the paper sheet separating roller and a paper sheet feeding roller.

3. The method for conveying and aligning a paper sheet in an image information processor of claim 1, further comprising sensing the paper sheet by a sensor after the feeding of the paper sheet toward the aligning roller.

4. The method for conveying and aligning a paper sheet in an image information processor of claim 1, further comprising ejecting the paper sheet after the paper sheet has been conveyed to the image reading portion.

* * * * *